(12) United States Patent
Mitsutake

(10) Patent No.: US 9,596,379 B2
(45) Date of Patent: Mar. 14, 2017

(54) IMAGE READING APPARATUS

(71) Applicant: CANON KABUSHIKI KAISHA, Tokyo (JP)

(72) Inventor: Ikutaro Mitsutake, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/057,672

(22) Filed: Mar. 1, 2016

(65) Prior Publication Data

US 2016/0269594 A1 Sep. 15, 2016

(30) Foreign Application Priority Data

Mar. 11, 2015 (JP) ................................. 2015-048010

(51) Int. Cl.
  *H04N 1/04* (2006.01)
  *H04N 1/409* (2006.01)
  *H04N 1/10* (2006.01)
  *H04N 1/028* (2006.01)

(52) U.S. Cl.
  CPC ........... *H04N 1/409* (2013.01); *H04N 1/0289* (2013.01); *H04N 1/1061* (2013.01); *H04N 2201/0081* (2013.01)

(58) Field of Classification Search
  CPC ........... H04N 1/02835; H04N 1/02855; H04N 1/02865; H04N 1/0289; H04N 1/02815; H04N 1/0284; H04N 1/0301; H04N 1/0303; H04N 1/0305; H04N 1/1043; H04N 1/1052; H04N 2201/02493; F21V 13/08; F21V 9/04
  See application file for complete search history.

(56) References Cited

U.S. PATENT DOCUMENTS

| | | | | | |
|---|---|---|---|---|---|
| 4,950,664 | A | * | 8/1990 | Goldberg | A61K 31/55 514/159 |
| 4,990,951 | A | * | 2/1991 | Sanbayashi | G03B 21/118 355/40 |
| 5,010,420 | A | * | 4/1991 | Hasegawa | G03B 21/132 358/471 |

(Continued)

FOREIGN PATENT DOCUMENTS

| | | |
|---|---|---|
| JP | 2004347775 A | 12/2004 |
| JP | 2013076923 A | 4/2013 |

*Primary Examiner* — Negussie Worku
(74) *Attorney, Agent, or Firm* — Rossi, Kimms & McDowell LLP

(57) ABSTRACT

Provided is an image reading apparatus capable of reading an image of an original at a high resolution by an image pickup unit by reducing an influence of a dark line included in a projection image on an original placing stand, which is ascribable to a displaying element included in a projecting unit and is to be exerted on an original placed on original placing stand. The image reading apparatus includes: an image pickup unit conducting image pickup for a placing surface; a projecting unit projecting an image on placing surface; and a switching unit switching a blur amount of image on placing surface, in which the switching unit sets a blur amount of image in a first mode, in which the image pickup is not conducted by image pickup unit, smaller than that in a second mode, in which the image pickup is conducted by image pickup unit.

12 Claims, 8 Drawing Sheets

(56) References Cited

U.S. PATENT DOCUMENTS

| | | | | |
|---|---|---|---|---|
| 5,895,914 | A * | 4/1999 | Tsai | H04N 1/1017 |
| | | | | 250/234 |
| 6,222,593 | B1 * | 4/2001 | Higurashi | G03B 37/04 |
| | | | | 315/368.12 |
| 9,157,182 | B2 * | 10/2015 | Campbell | B26D 5/007 |
| 2009/0167876 | A1 * | 7/2009 | Ueda | G06F 3/0346 |
| | | | | 348/207.99 |
| 2009/0322968 | A1 * | 12/2009 | Kobayashi | G03B 21/40 |
| | | | | 348/745 |
| 2011/0157182 | A1 * | 6/2011 | Wu | H04N 9/3188 |
| | | | | 345/428 |
| 2013/0083369 | A1 * | 4/2013 | Mitsutake | H04N 1/02855 |
| | | | | 358/474 |
| 2013/0107333 | A1 * | 5/2013 | Hayashide | H04N 1/1043 |
| | | | | 358/494 |
| 2014/0055827 | A1 * | 2/2014 | Mitsutake | G02B 6/0091 |
| | | | | 358/475 |
| 2014/0253982 | A1 * | 9/2014 | Mitsutake | H04N 1/02815 |
| | | | | 358/475 |
| 2016/0085016 | A1 * | 3/2016 | Ito | G02B 6/0035 |
| | | | | 358/484 |

* cited by examiner

IMAGE READING APPARATUS

BACKGROUND OF THE INVENTION

Field of the Invention

The present invention relates to an image reading apparatus. More particularly, the present invention relates to an image reading apparatus with a projector, which is configured to read an image of an original at a high resolution.

Description of the Related Art

An image reading apparatus with a projector is hitherto known.

In Japanese Patent Application Laid-Open No. 2013-76923, there is disclosed a projection apparatus capable of changing an illumination range and an illumination intensity distribution in illumination produced by a projector.

Further, in Japanese Patent Application Laid-Open No. 2004-347775, there is disclosed a projector capable of intentionally blurring a pixel interval in order to improve visual performance of a projected image.

However, in an image reading apparatus that uses in combination a related-art projector as an apparatus configured to illuminate an object, when a resolution of the image reading apparatus exceeds a resolution of the projector, information on minute illumination unevenness is superimposed on original image information.

Examples of a cause of the minute illumination unevenness include a streak between display pixels of the projector. The streak is caused by an influence of an electrode or the like that forms an image displaying element such as a liquid crystal panel, and therefore cannot be eliminated even when the streak can be reduced by being subjected to thinning or the like. Further, in addition to the liquid crystal panel, the same applies to an image displaying element configured to drive a fine mirror surface.

Therefore, the present invention provides an image reading apparatus capable of reading an image of an original at a high resolution by an image pickup unit by reducing an influence of a dark line included in a projection image on an original placing stand, which is ascribable to a displaying element included in a projecting unit and is to be exerted on an original placed on the original placing stand.

SUMMARY OF THE INVENTION

According to one embodiment of the present invention, there is provided an image reading apparatus, including: an image pickup unit configured to conduct image pickup for a placing surface; a projecting unit configured to project an image on the placing surface; and a switching unit configured to switch a blur amount of the image on the placing surface, in which the switching unit is further configured to set a blur amount of the image in a first mode, in which the image pickup is not conducted by the image pickup unit, smaller than a blur amount of the image in a second mode, in which the image pickup is conducted by the image pickup unit.

Further features of the present invention will become apparent from the following description of exemplary embodiments with reference to the attached drawings.

DESCRIPTION OF THE EMBODIMENTS

An image reading apparatus according to embodiments of the present invention are described in the following with reference to the attached drawings. Note that, for the sake of easy understanding of the present invention, the drawings referred to in the following description are not necessarily drawn to scale.

Figure 1:
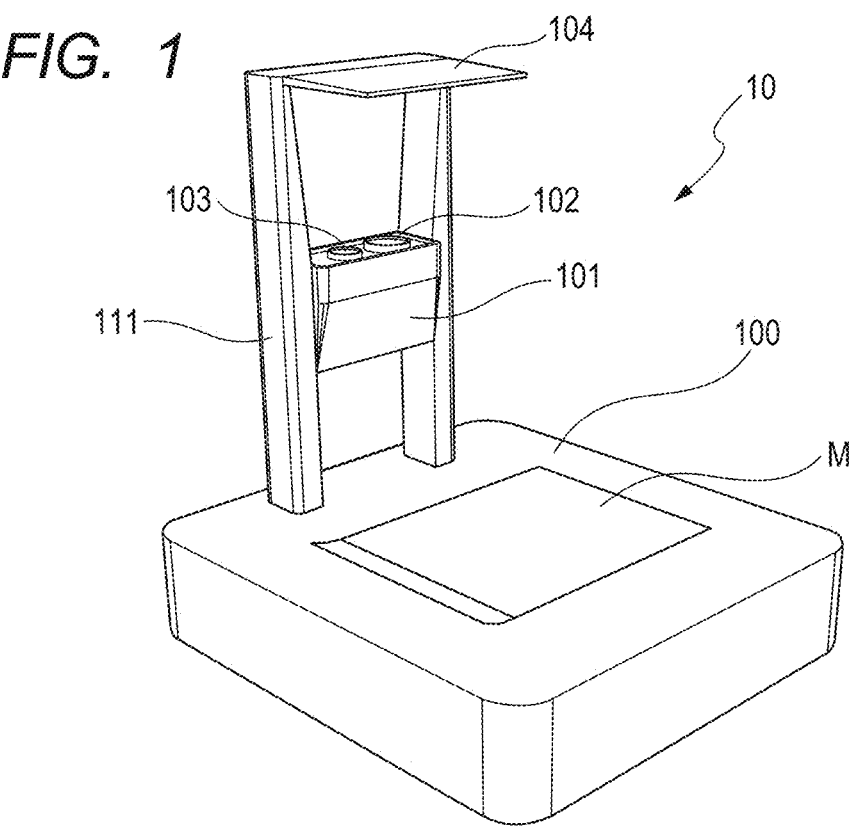
FIG. 1 is a perspective view of an image pickup apparatus according to a first embodiment of the present invention.

FIG. 1 is a perspective view for illustrating an image reading apparatus 10 according to a first embodiment of the present invention.

The image reading apparatus 10 includes an original placing stand 100, an optical unit 101, a projecting unit 102, an image pickup unit 103, a mirror 104, and a support column 111.

An original M is placed on the original placing stand 100.

The optical unit 101 contains the projecting unit 102 and the image pickup unit 103.

The projecting unit 102 is configured to emit a light beam to be used for projecting an image or character information on the original placing stand 100.

The image pickup unit 103 is configured to pick up an image of a reading target such as the original M placed on the original placing stand 100.

The mirror 104 is configured to reflect the light beam emitted from the projecting unit 102 toward the original placing stand 100, and reflect the light beam from the original placing stand 100 toward the image pickup unit 103.

The support column 111 is arranged fixedly on the original placing stand 100, and is configured to hold the optical unit 101 and the mirror 104.

When the image or the character information is projected on the original placing stand 100, the light beam is emitted from a light source (not shown) included in the projecting unit 102. The light beam passes through a displaying element (not shown) such as a liquid crystal panel included in the projecting unit 102, and is emitted from a projection lens (not shown) included in the projecting unit 102. Then, the light beam emitted from the projection lens is reflected by the mirror 104, and is projected on the original placing stand 100. That is, the displaying element is configured to display an original image, and the projection lens is configured to form an image of the original image onto a conjugate surface.

Figure 2:
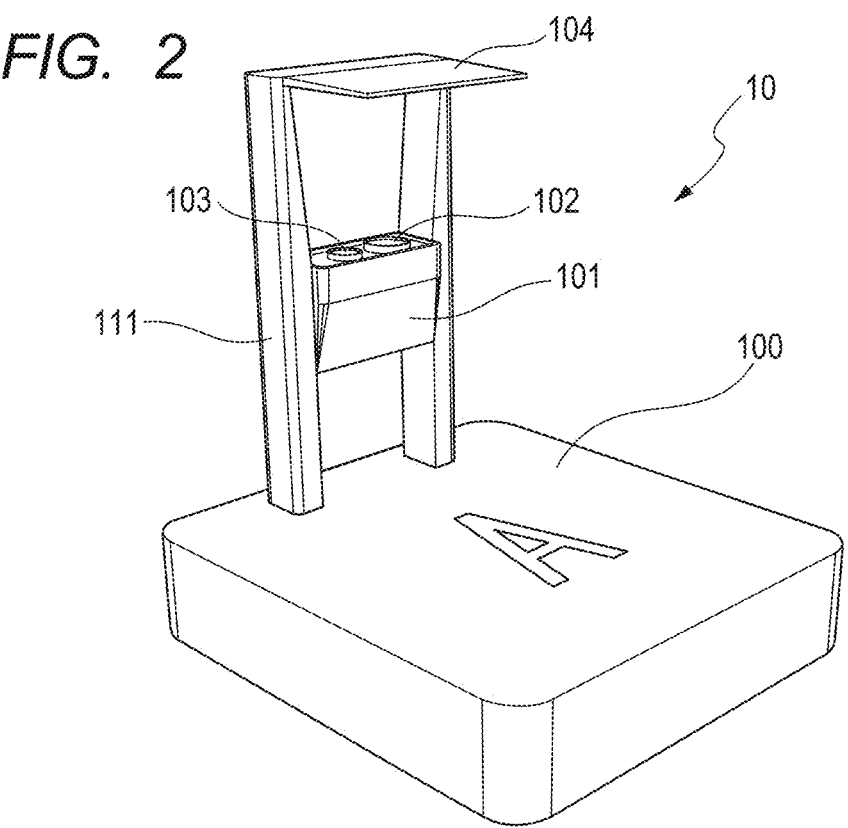
FIG. 2 is a perspective view of the image pickup apparatus according to the first embodiment.

As a result, as illustrated in FIG. 2, an image can be projected on the original placing stand 100.

When an image of the reading target such as the original M placed on the original placing stand 100 is picked up, a light beam from the reading target reflected by the mirror 104 enters an image pickup lens (not shown) included in the image pickup unit 103. The light beam that has entered the image pickup lens is condensed (received) onto an image pickup element (not shown) such as a CMOS sensor included in the image pickup unit 103 by the image pickup lens, to thereby allow the image of the reading target to be picked up.

Note that, when the image of the reading target such as the original M placed on the original placing stand 100 is picked up, the original placing stand 100 is illuminated by the projecting unit 102 in order to reduce unevenness in brightness due to environmental light, shorten an exposing time to be taken by the image pickup unit 103, and reduce noise to be caused by the image pickup.

The following use mode is conceivable for the image reading apparatus 10 according to this embodiment.

For example, a case where the image reading apparatus 10 picks up an image of a filled-in document is considered. First, the filled-in document is placed on the original placing stand 100 by a user. Then, the image reading apparatus 10 picks up an image of the filled-in document, and examines whether or not there is an entry omission, a seal omission, or the like based on the image obtained by the image pickup. When an entry omission, a seal omission, or the like is found from the image, the image reading apparatus 10 projects an image indicating the found portion on the filled-in document. When an entry omission, a seal omission, or the like is not found from the image, the image reading apparatus 10 records the obtained image as an electronic document.

Further, as another use mode, when the user specifies a range that the user desires to pick up an image on the original placed on the original placing stand 100, the image reading apparatus 10 picks up the image of the original only within the range that the user desires to pick up the image. Note that, the image reading apparatus 10 may pick up the image of the original only within the range that the user desires to pick up the image by zooming through use of a zoom function of the image reading apparatus 10.

Note that, the range that the user desires to pick up the image can be determined by detecting a motion of a finger of the user through use of a motion capture apparatus (not shown). Further, the image reading apparatus 10 may determine the range that the user desires to pick up the image by picking up an image of the motion of the finger of the user. Then, the determined range that the user desires to pick up the image can be indicated by being illuminated by the projecting unit more brightly than a periphery thereof.

Further, an instruction issued by the user for an operation of the image reading apparatus 10 can be determined by detecting the user's pressing of a mechanical push button (not shown) or a touch panel (not shown). Further, the image reading apparatus 10 may determine the instruction by projecting an image of a button or the like on the original placing stand 100 and picking up the image of the motion of the finger of the user exhibited with respect to the projected image of a button. The use of the latter method eliminates a need to provide a member such as a mechanical push button or a touch panel, which allows cost saving and allows flexible use of a user interface.

Next, problems that occur in a related-art image reading apparatus are described specifically.

In the image reading apparatus, an imaging optical system of an image pickup unit needs to be provided with high performance in order to pick up the image of an original placed on an original placing stand with high definition. In addition, in order to downsize the image reading apparatus, there is a need to provide a compact image pickup element having a large number of pixels.

For example, in a case where a size of an original is an A3 size ((297 mm)×(420 mm)) in ISO 216, when image information on the original is to be read with a resolution of 300 dpi (11.8 pix/mm) at one time of image pickup, the image pickup element needs to have approximately 17,500,000 pixels. Therefore, assuming that the image pickup element is a rectangle, the image pickup element needs to be formed to have a long side of approximately 5,000 pixels and a short side of approximately 3,500 pixels.

Further, in the image reading apparatus discussed here, the displaying element of the projecting unit configured to illuminate the original for the image pickup is assumed to be a displaying element used for a projector configured to mainly project a video, for example, a transmissive liquid crystal panel, a reflective liquid crystal panel, or a micromirror array.

In this case, the light beam emitted from the light source included in the projecting unit is transmitted through the displaying element configured to display the original image, which is used for the projector, or reflected by the displaying element, and is projected on the original placing stand as a projected image (image of the original image). In that case, the projected image includes a dark part corresponding to a non-display part existing between the pixels of the displaying element.

Further, in general, the number of pixels of the displaying element used for the projector is smaller than the number of pixels of the image pickup element used for the related-art image reading apparatus.

Therefore, when such a displaying element is used to project a white color for illumination on the original placing stand and when such an image pickup element is used to pick up the image of the original placed on the original placing stand, the image pickup is conducted so that the above-mentioned dark part is recognizable in the picked-up image, which may cause a problem in recognition or quality of the picked-up image.

The above-mentioned problem is described below through use of specific numerical values.

It is assumed that the image reading apparatus includes the image pickup unit including the image pickup element being a rectangle having 17,500,000 pixels (with a long side of approximately 5,000 pixels and a short side of approximately 3,500 pixels), and the projecting unit that uses the displaying element being a rectangle having approximately 2,300,000 pixels (with a long side of 1,920 pixels and a short side of 1,200 pixels). It is further assumed that the projecting unit included in the image reading apparatus is capable of collectively projecting an entire area of an image pickup range on the original placing stand.

Figure 3A:
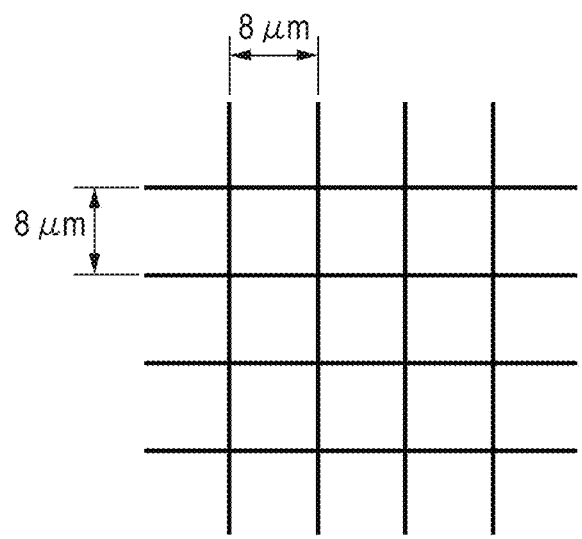
FIG. 3A is a partially enlarged diagram of a displaying element included in a projecting unit of the image pickup apparatus.

For example, it is assumed that, as illustrated in FIG. 3A, one pixel of the displaying element has a size of (8 µm)×(8 µm) with a non-display portion of 0.4 µm (solid line illustrated in FIG. 3A) existing between the pixels. Assuming that the light beam emitted from the light source passes through such a displaying element and that an image of the displaying element is projected on the original placing stand while being magnified by 31 times, the image of the displaying element becomes an image of a rectangle having a long side of approximately 500 mm and a short side of approximately 312 mm on the original placing stand. That is, a range of (500 mm)×(312 mm) on the original placing stand is illuminated. Then, in a case of geometric optical ideal imaging, one pixel of the displaying element is projected as a bright image having a size of (0.248 mm)×(0.248 mm), and the non-display portion is projected as a dark line having a width of 0.0124 mm.

Therefore, a resolution of projection of approximately 3.8 pixels per mm (Rp=3.8 pix/mm) is exhibited on the original placing stand.

Figure 3B:
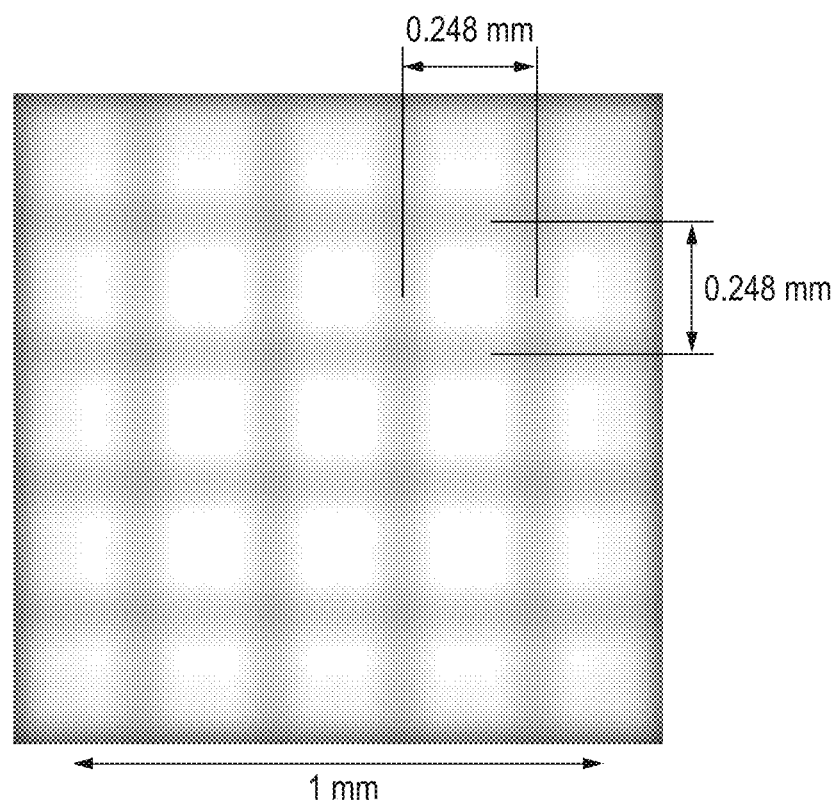
FIG. 3B is a diagram for illustrating an image of the displaying element which is obtained through a simulation and projected in the projecting unit of the image pickup apparatus.

In FIG. 3B, the image of the displaying element obtained by simulating a wave-optical imaging state of a several-pixel range in a central portion of a projection range based on the above-mentioned conditions in consideration of imaging of an actual lens is illustrated. Note that, in this simulation, influences of aberration and diffraction are taken into consideration, and hence the image of the non-display portion is wider than 0.0124 mm.

In contrast, the image pickup unit picks up an image of the image pickup range on the original placing stand with 300 dpi, which exhibits a resolution of image pickup of approximately 11.8 pixels per mm (Ri=11.8 pix/mm), and the image information on the original is recorded with a pitch of approximately 0.085 mm.

Figure 4:
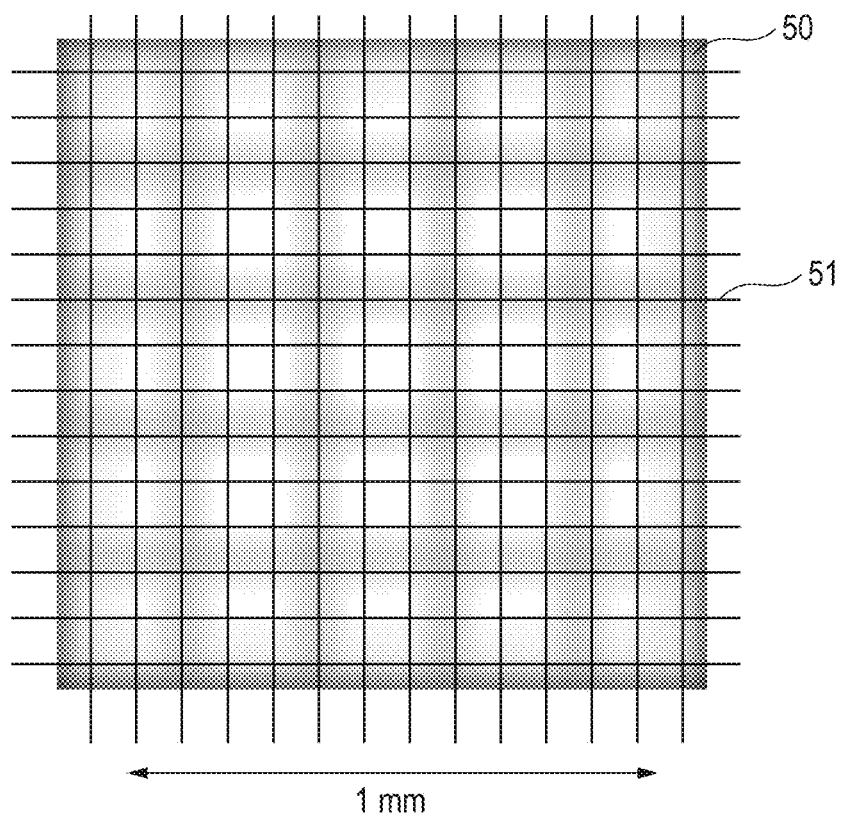
FIG. 4 is a diagram obtained by superimposing an image of an image pickup element on the image of the displaying element projected on an original placing stand of the image pickup apparatus.

In FIG. 4, an image 50 of the displaying element projected on the original placing stand of the image reading apparatus and an image 51 of the image pickup element are illustrated by being superimposed one on another under the above-mentioned conditions.

As can be understood from FIG. 4, dark portions corresponding to the non-display portions between the pixels of the displaying element may be recorded in a lattice shape by the image pickup element, which may cause a problem in recognition of a character whose image has been picked up or in quality of the image.

Note that, in this case, the image pickup unit is assumed to have a reading resolution of 300 dpi, but the image can be read with a resolution of 430 dpi through use of, for example, an image pickup element having approximately 36,000,000 pixels sold as an image pickup element for a digital single-lens reflex camera currently on the market. In this case, the image pickup unit can record light and darkness information with a finer pitch, and hence a contrast of light and darkness within the image of the displaying element becomes more conspicuous.

Meanwhile, depending on a use purpose, an image may be read with a lower resolution. For example, when the image is read by the image pickup unit having a resolution of 25.4 dpi (spatial resolution of 1 pix/mm), the dark portion corresponding to the non-display portion between the pixels of the displaying element is averaged within one pixel of an image of the image pickup element, and the contrast of light and darkness becomes less noticeable.

Figure 5:
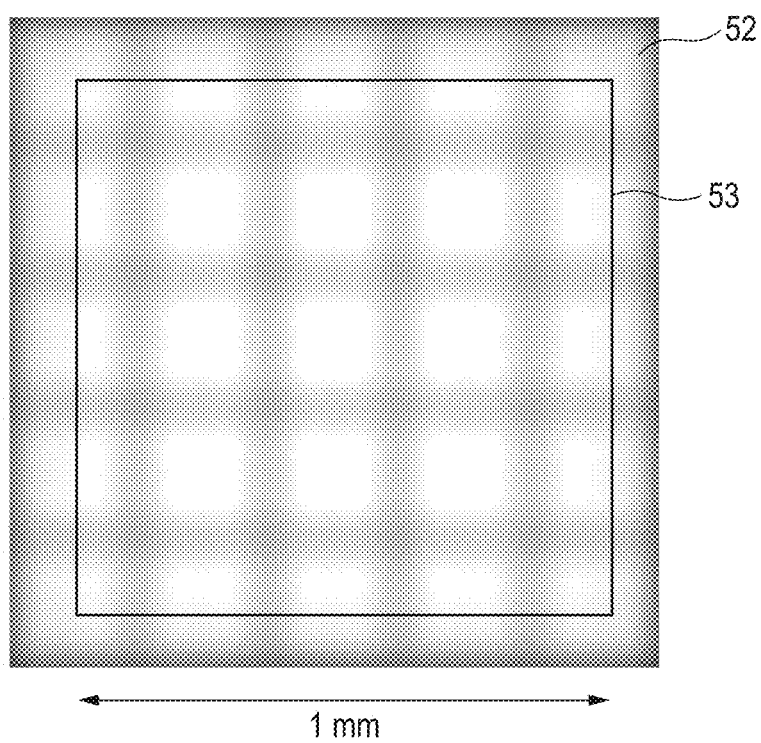
FIG. 5 is a diagram obtained by superimposing the image of the image pickup element on the image of the displaying element projected on the original placing stand of the image pickup apparatus.

In FIG. 5, an image 52 of the displaying element projected on the original placing stand of the image reading apparatus and an image 53 of the image pickup element are illustrated by being superimposed one on another under the above-mentioned conditions.

As described above, when the resolution of image pickup is higher than the resolution of projection, the dark portions corresponding to the non-display portions between the pixels of the displaying element may be recorded in a lattice shape by the image pickup element, which may cause a problem in recognition of the character whose image has been picked up or in quality of the image.

In order to solve this problem, the image reading apparatus 10 according to this embodiment is configured so that, when the resolution of image pickup is higher than the resolution of projection, a displaying element conjugate surface (image surface of the projecting unit 102) at a time of image pickup is set in a position shifted from a surface of the original placing stand 100 toward an optical path direction. With this configuration, the image of the displaying element is not formed onto the original placing stand 100, which causes the contrast of light and darkness to become less noticeable.

Figure 6:
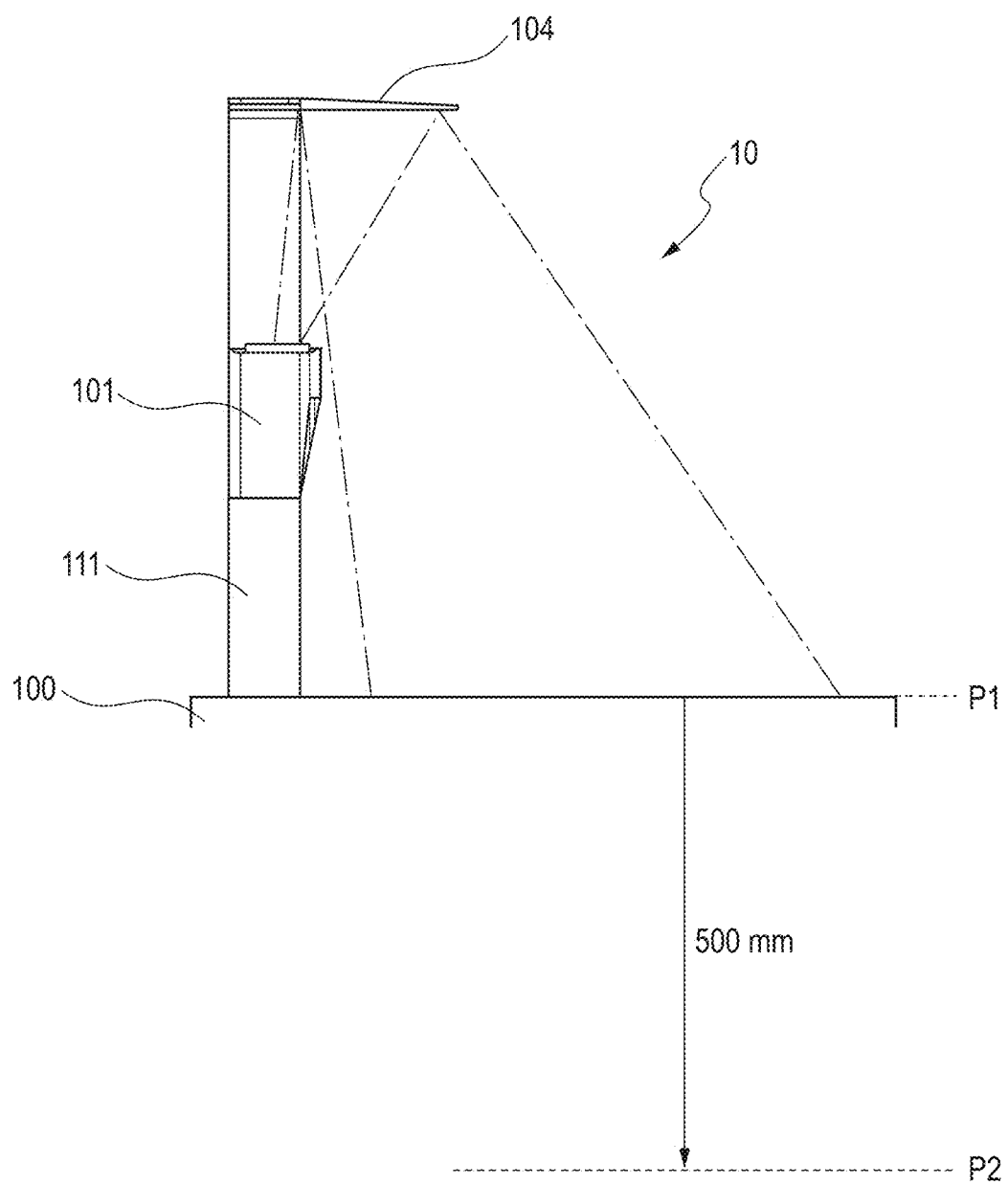
FIG. 6 is a diagram for illustrating a displaying element conjugate surface at a time of image projection and a displaying element conjugate surface at a time of image pickup in the image pickup apparatus according to the first embodiment.

In FIG. 6, a displaying element conjugate surface $P_1$ at a time of image projection and a displaying element conjugate surface $P_2$ at the time of image pickup in the image reading apparatus 10 according to this embodiment are illustrated.

As illustrated in FIG. 6, the displaying element conjugate surface $P_2$ at the time of image pickup is shifted by a switching unit (not shown) toward a direction (over side) away from the optical unit 101 relative to the displaying element conjugate surface $P_1$ at the time of image projection.

Note that, a distance between the displaying element conjugate surfaces $P_1$ and $P_2$, that is, a moving amount of the displaying element conjugate surface at the time of image pickup varies depending on a width of the non-display portion between the pixels of the displaying element, an F-number of a projecting optical system, a projection magnification, or the like. It is preferred that, on the whole, a light flux that projects one pixel of the displaying element be sufficiently wider than an image of one pixel of the image pickup element within the image pickup target on the original placing stand 100. In this embodiment, the moving amount is set to 500 mm.

Figure 7A:
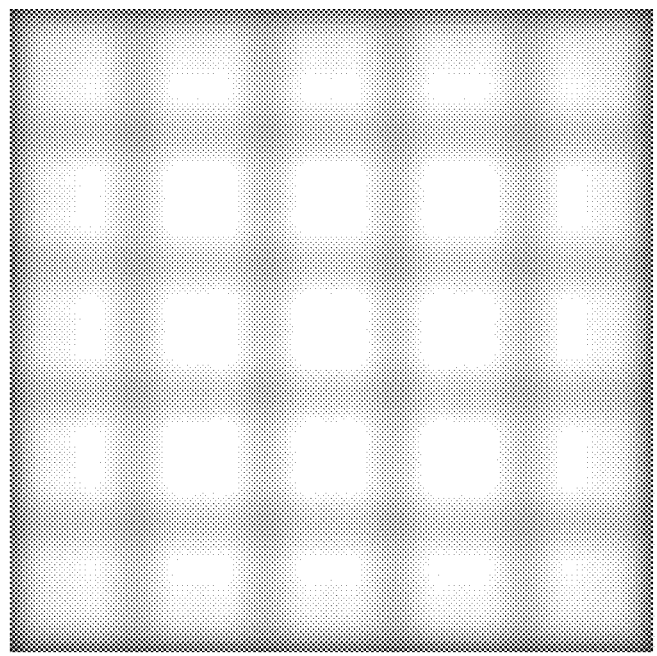
FIG. 7A is a diagram for illustrating the image of the displaying element at the time of image projection on the original placing stand of the image pickup apparatus according to the first embodiment.
Figure 7B:
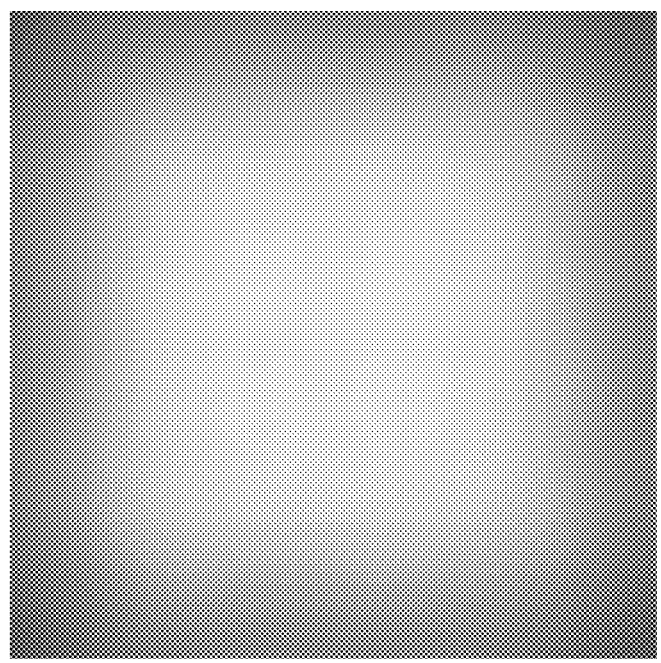
FIG. 7B is a diagram for illustrating the image of the displaying element at the time of image pickup on the original placing stand of the image pickup apparatus according to the first embodiment.

In FIG. 7A and FIG. 7B, the image of the displaying element at the time of image projection and the image of the displaying element at the time of image pickup, respectively, on the original placing stand 100 of the image reading apparatus 10 according to this embodiment are illustrated.

As illustrated in FIG. 7A and FIG. 7B, when the displaying element conjugate surface is shifted toward the over side at the time of image pickup, the image of the displaying element in which the contrast of light and darkness is noticeable at the time of image projection is changed to the image of the displaying element in which the contrast of light and darkness is not noticeable at the time of image pickup. That is, a blur of the image of the displaying element (projected image) is switched by the switching unit (not shown).

Note that, end portions of the images of the displaying element illustrated in FIG. 7A and FIG. 7B are dark because a limitation is imposed on a range for simulating the image of the displaying element to be formed, and such a difference between light and darkness does not occur within the several-pixel range in the central portion of an actual projection range.

In this manner, as a guide, when a modulation transfer function (MTF) using a spatial frequency of the pixel pitch of the displaying element projected on the image pickup target as a parameter is equal to or smaller than 20%, more preferably equal to or smaller than 10%, the contrast of light and darkness within the image of the displaying element becomes less noticeable.

Note that, in the image reading apparatus 10 according to this embodiment, a direction for moving the displaying element conjugate surface at the time of image pickup is set to the direction away from the optical unit 101.

This is because, when the displaying element conjugate surface is shifted toward a direction approaching the optical unit 101 at the time of image pickup in a case where the image pickup target is a book or the like having a thickness, the displaying element conjugate surface becomes closer to a reading target surface to reduce an effect of shifting a focus.

From the above description, when the displaying element conjugate surface is moved toward the over side at the time of image pickup as in the image reading apparatus 10 according to this embodiment, even in the case where the image pickup target is a book having a thickness, the contrast of light and darkness within the image of the displaying element becomes less noticeable.

Further, in the image reading apparatus 10 according to this embodiment, when the resolution of image pickup is lower than the resolution of projection in a case of, for example, photographing of a preview image or image pickup for detecting the image pickup range, the contrast of light and darkness within the image of the displaying element exerts a small influence on image quality. Therefore, the displaying element conjugate surface is not shifted at the time of image pickup.

In the image reading apparatus 10 according to this embodiment, the surface of the original placing stand 100 is first illuminated by the projecting unit. When an instruction for reading of the original on the original placing stand 100 is issued, the image reading apparatus 10 selects suitable image pickup conditions from the resolution of image pickup (namely, spatial frequency of the image pickup element) and the resolution of projection (namely, spatial frequency of the displaying element on the original placing stand 100) that have been set or specified. Then, the image reading apparatus 10 conducts an operation of the projecting unit.

Specifically, when the resolution of projection on the original placing stand (number of pixels per unit length of a projection image of the displaying element in a conjugate surface) is set to $Rp$ (pix/mm) and the resolution of image pickup on the original placing stand (number of pixels per unit length of the image of the image pickup element on the original placing stand) is set to $Ri$ (pix/mm), the following image pickup conditions are obtained. When $Ri>2Rp$, the image pickup is conducted in an image pickup mode for causing a defocus in the projecting optical system. When $Ri<4Rp$, the image pickup is conducted in a projecting mode without a change. In other words, the image pickup mode is used when $Ri \geq 4Rp$, the projecting mode is used when $Ri \leq 2Rp$, and one of the image pickup mode and the projecting mode is used when $2Rp<Ri<4Rp$.

In the image reading apparatus 10 according to this embodiment, as a user interface that allows the user to issue an instruction to the image reading apparatus 10, graphic forms and characters that correspond to operation buttons are projected on the original placing stand 100 by the projecting unit in addition to the illumination.

Figure 8:
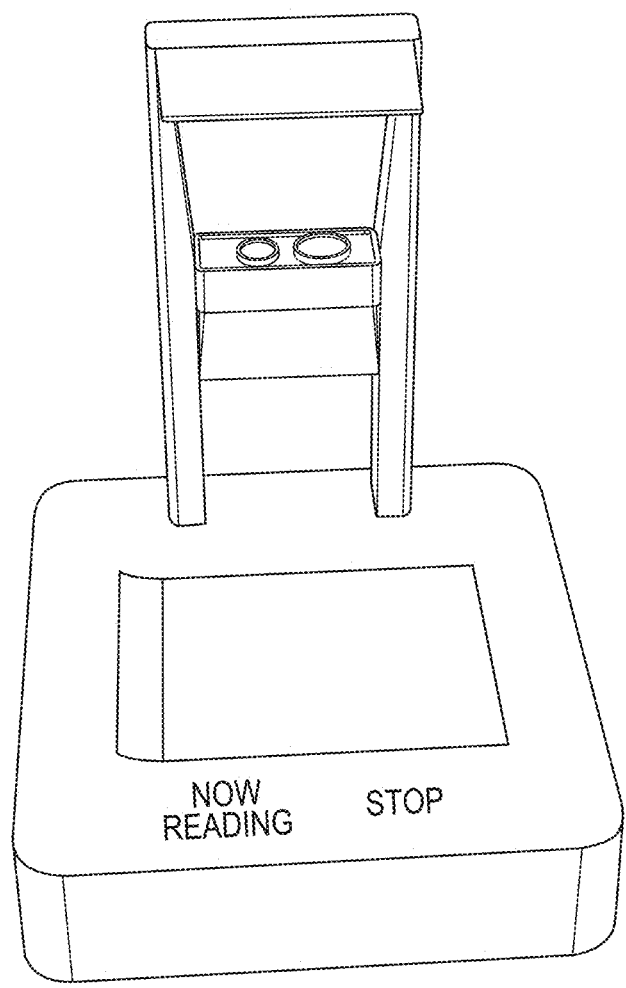
FIG. 8 is a diagram for illustrating a state in which graphic forms and characters that correspond to operation buttons are projected in the image pickup apparatus according to the first embodiment.

In FIG. 8, a state in which the graphic forms and the characters that correspond to the operation buttons are projected in the image reading apparatus 10 according to this embodiment is illustrated.

Further, the image reading apparatus 10 according to this embodiment employs a system configured to determine the instruction issued by the user by picking up the image of the motion of the finger exhibited with respect to a projected button by the image pickup unit.

In this case, the graphic forms and the characters that correspond to the operation buttons and have been projected on the original placing stand 100 are blurred when the displaying element conjugate surface at the time of image pickup is shifted, and the graphic forms and the characters become difficult to be recognized by the user.

Therefore, in the image reading apparatus 10 according to this embodiment, the graphic forms and the characters are displayed with a low spatial frequency, that is, displayed to become larger, so that the user can easily recognize the graphic forms and the characters that correspond to the operation buttons even when the displaying element conjugate surface is shifted at the time of image pickup.

Specifically, a thickness of a stroke of the character and a line width of the graphic form are formed of at least 4 pixels of the displaying element, and substantially, the graphic forms and the characters that correspond to the operation buttons are displayed with a spatial frequency of equal to or smaller than ¼ of a resolving power of the displaying element.

Figure 9:
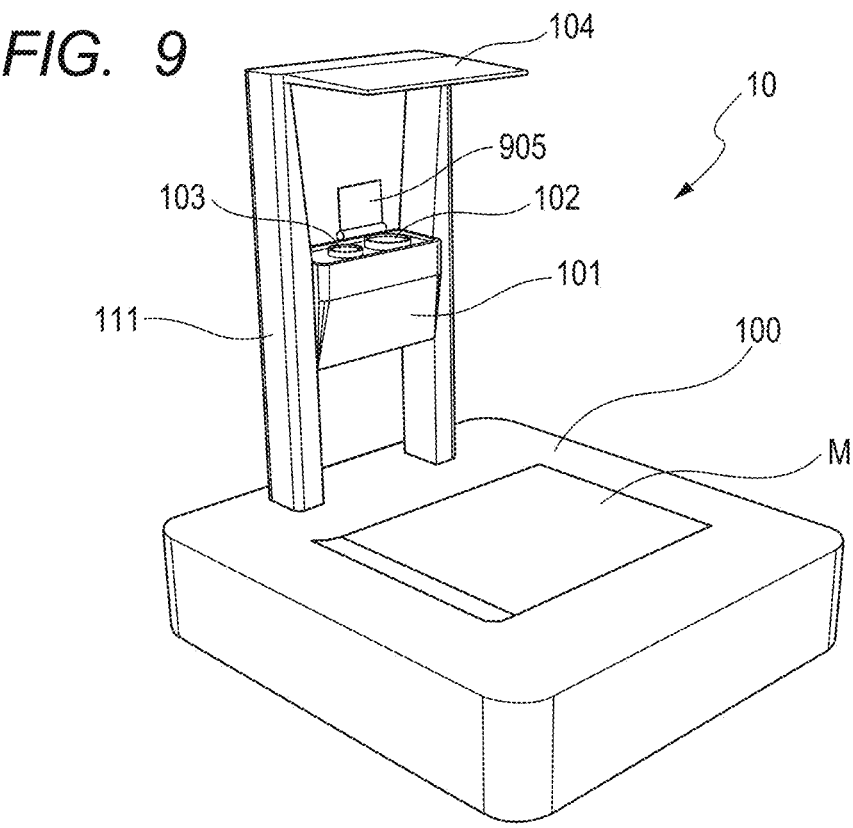
FIG. 9 is a perspective view for illustrating an image pickup apparatus according to a second embodiment of the present invention.

FIG. 9 is a perspective view for illustrating an image reading apparatus 90 according to a second embodiment of the present invention.

Note that, the image reading apparatus 90 according to the second embodiment further includes a diffusing unit 905, while otherwise having the same components as those of the image reading apparatus 10 according to the first embodiment, and hence the same components are denoted by the same reference symbols with descriptions thereof being omitted.

The diffusing unit 905 is capable of diffusing the light beam emitted from the projecting unit 102 when being arranged on an optical path of the light beam emitted from the projecting unit 102.

Figure 10:
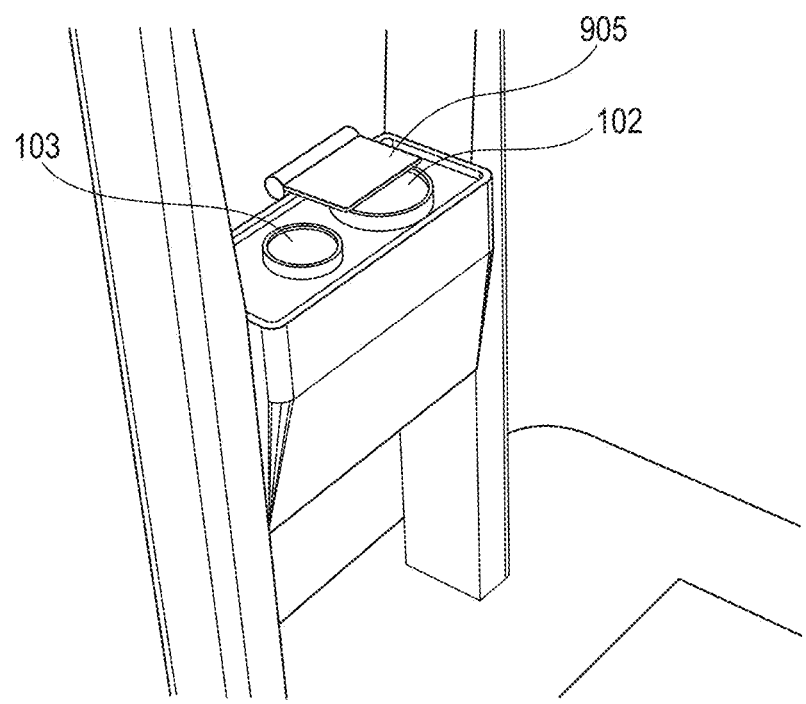
FIG. 10 is a partially enlarged perspective view for illustrating the image pickup apparatus according to the second embodiment.

FIG. 10 is a partially enlarged perspective view for illustrating the image reading apparatus 90 according to the second embodiment.

As described above, in the image reading apparatus 90, when the resolution of image pickup is higher than the resolution of projection, the dark portions corresponding to the non-display portions between the pixels of the displaying element may be recorded in a lattice shape by the image pickup element. In that case, in the image reading apparatus 90, as illustrated in FIG. 10, the diffusing unit 905 is arranged in a part of the optical path of the light beam emitted from the projecting unit 102 so as to diffuse a part of the light beam emitted from the projecting unit 102. That is, the diffusing unit 905 is arranged in at least a part of the optical path of the light beam emitted from the projecting unit 102 or retracted from the optical path by the switching unit (not shown).

Figure 11:
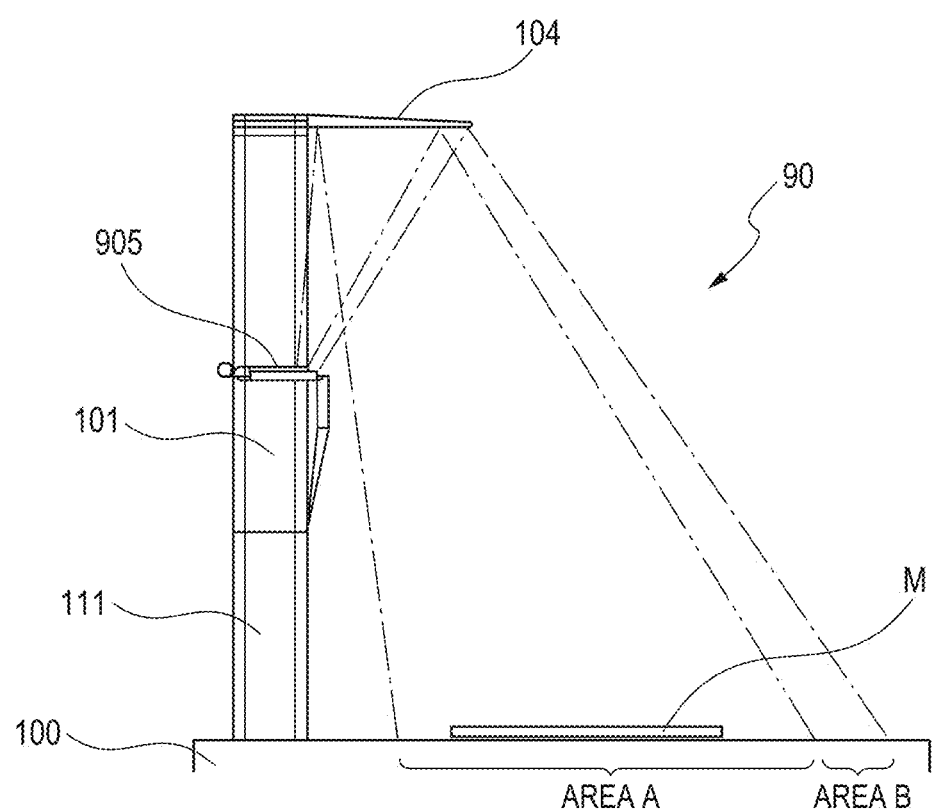
FIG. 11 is a sectional view for illustrating the image pickup apparatus according to the second embodiment.

FIG. 11 is a sectional view for illustrating the image reading apparatus 90 according to the second embodiment.

As illustrated in FIG. 11, the diffusing unit 905 is arranged in a part of a cross section perpendicular to the optical path of the light beam emitted from the projecting unit 102, to thereby cause the light beam that has passed through the diffusing unit 905 to be projected on a peripheral area A of the original M on the original placing stand 100 in a blurred state. Meanwhile, the light beam that has not passed through the diffusing unit 905 is projected on an area B in a vicinity of an edge portion of the original placing stand 100 in a state of not being blurred.

With this configuration, the contrast of light and darkness of illumination light projected on a periphery of the original M on the original placing stand 100 can be caused to become less noticeable. Further, at the same time, the contrast of light and darkness of the graphic forms and the characters that correspond to the operation buttons projected as the user interface on the vicinity of the edge portion of the original placing stand 100 can be maintained at a high level. That is, a blur amount of the projected image is switched by the switching unit (not shown).

Note that, as a guide, the diffusing unit 905 included in the image reading apparatus 90 is designed so that the MTF using the spatial frequency of the pixel pitch of the displaying element projected on the image pickup target as a parameter is equal to or smaller than 20%, more preferably equal to or smaller than 10%.

Therefore, the contrast of light and darkness can be prevented from becoming noticeable by projecting the light beam used for illuminating the original M on the original M in a blurred state, while a part for displaying the user interface or the preview image can be displayed with high definition by making use of a resolving power intrinsic to the projecting unit.

Note that, as the diffusing unit 905, not only a transmissive diffusing member such as frosted glass but also various members that can blur the projection image, for example, a birefringent plate, can be used. Further, the projection image can be blurred by vibrating the displaying element or the projection lens of the projecting unit. Also in regard to an arrangement position of the diffusing unit 905, in addition to the arrangement position used in this embodiment, the diffusing unit 905 may be arranged in a vicinity of the light source included in the projecting unit.

As described above, according to the present invention, the image reading apparatus capable of reading an image at a high resolution while conducting illumination and operation instruction by the projector can be provided.

According to the present invention, the image of the original may be read at a high resolution by the image pickup unit by reducing the influence of the dark line included in the projection image on the original placing stand, which is ascribable to the displaying element included in the projecting unit and is to be exerted on the original placed on the original placing stand.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-048010, filed Mar. 11, 2015, which is hereby incorporated by reference herein in its entirety.

What is claimed is:

1. An image reading apparatus, comprising:
   an image pickup unit configured to conduct image pickup from a placing surface; and
   a projecting unit configured to project an image on the placing surface,
   wherein the projecting unit is configured to switch a blur amount of the image on the placing surface, and
   wherein the projecting unit is further configured to set a blur amount of the image in a first mode, in which the image pickup is not conducted by the image pickup unit, smaller than a blur amount of the image in a second mode, in which the image pickup is conducted by the image pickup unit.

2. An image reading apparatus according to claim 1, wherein the projecting unit is further configured to project a white image in the second mode.

3. An image reading apparatus according to claim 1, wherein:
   the image pickup unit comprises an image pickup element configured to receive light from the placing surface; and
   the projecting unit comprises a displaying element configured to display an original image.

4. An image reading apparatus according to claim 3, wherein a number of pixels of the image pickup element is larger than a number of pixels of the displaying element.

5. An image reading apparatus according to claim 3, wherein:
   the image pickup unit further comprises an image pickup lens configured to form an image on the placing surface onto the image pickup element;
   the projecting unit further comprises a projection lens configured to form an image of the displaying element onto a conjugate surface; and
   assuming that a number of pixels per unit length of a projection image of the displaying element in the conjugate surface is set to Rp (pix/mm) and a number of pixels per unit length of an image of the image pickup element on the placing surface is set to Ri (pix/mm),
   the projecting unit is further configured to move the conjugate surface in a direction away from the placing surface when Ri≥4Rp, move the conjugate surface in a direction approaching the placing surface when Ri≤2Rp, and move the conjugate surface in one of the direction away from the placing surface and the direction approaching the placing surface when 2Rp<Ri<4Rp.

6. An image reading apparatus according to claim 5, wherein the projecting unit is further configured to move a position of the conjugate surface in the second mode to a position farther away from the placing surface than a position of the conjugate surface in the first mode.

7. An image reading apparatus according to claim 3, wherein, in the second mode, an MTF using a spatial frequency of a pixel pitch of the displaying element projected on the placing surface as a parameter is equal to or smaller than 20%.

8. An image reading apparatus according to claim 1, wherein:
   the projecting unit comprises:
      a displaying element configured to display an original image; and
      a projection lens configured to form an image of the original image; and
   the projecting unit is further configured to vibrate at least one of the displaying element or the projection lens in the second mode.

9. An image reading apparatus according to claim 1, wherein:
   the projecting unit comprises a diffusing unit configured to diffuse light; and the projecting unit is further configured to insert the diffusing unit into an optical path of the projecting unit in the second mode.

10. An image reading apparatus according to claim 1, wherein the projecting unit is configured to move a position of an image surface of the projecting unit in the second mode to a position farther away from the placing surface than a position of the image surface in the first mode.

11. An image reading apparatus, comprising:
a projecting unit configured to switch between a first mode for projecting a first image on a placing surface and a second mode for projecting a second image on the placing surface; and
an image pickup unit configured to conduct image pickup for the placing surface in the second mode
wherein the projecting unit is configured to set a blur amount of the second image larger than a blur amount of the first image, and
wherein the image pickup is not conducted by the image pickup unit in the first mode.

12. An image reading apparatus, comprising:
a projecting unit which comprises a displaying element configured to display an original image and a projection lens configured to form an image of the original image onto a conjugate surface, and which is configured to switch between a first mode for projecting an image on a placing surface and a second mode for illuminating the placing surface; and
an image pickup unit configured to conduct image pickup for the placing surface illuminated by the projecting unit in the second mode
wherein the projecting unit is configured to conduct, in the second mode, at least inserting of a diffusing unit into an optical path of the projecting unit or moving of the conjugate surface in a direction away from the placing surface.

* * * * *